No. 707,488. Patented Aug. 19, 1902.
E. A. WRIGHT.
APPARATUS FOR ELEVATING OR CONVEYING AND TRANSFERRING ICE, &c.
(Application filed Feb. 15, 1900.)
(No Model.) 3 Sheets—Sheet 1.
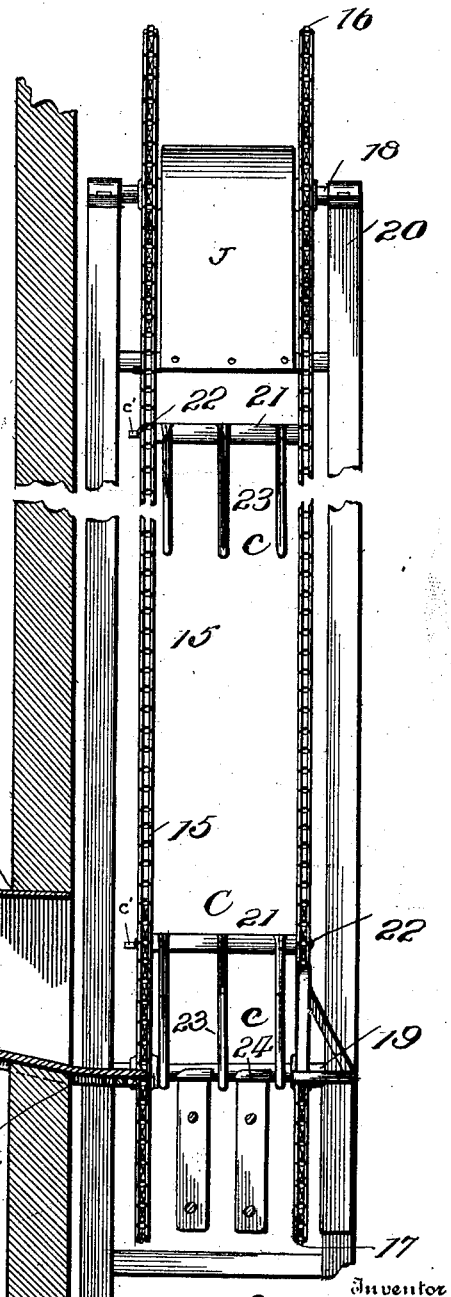
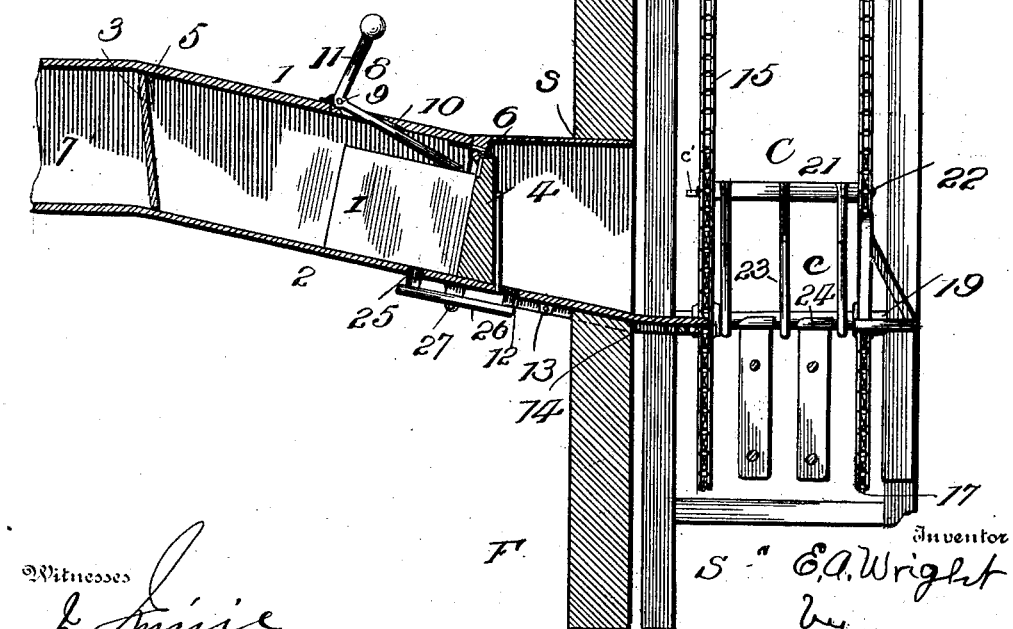

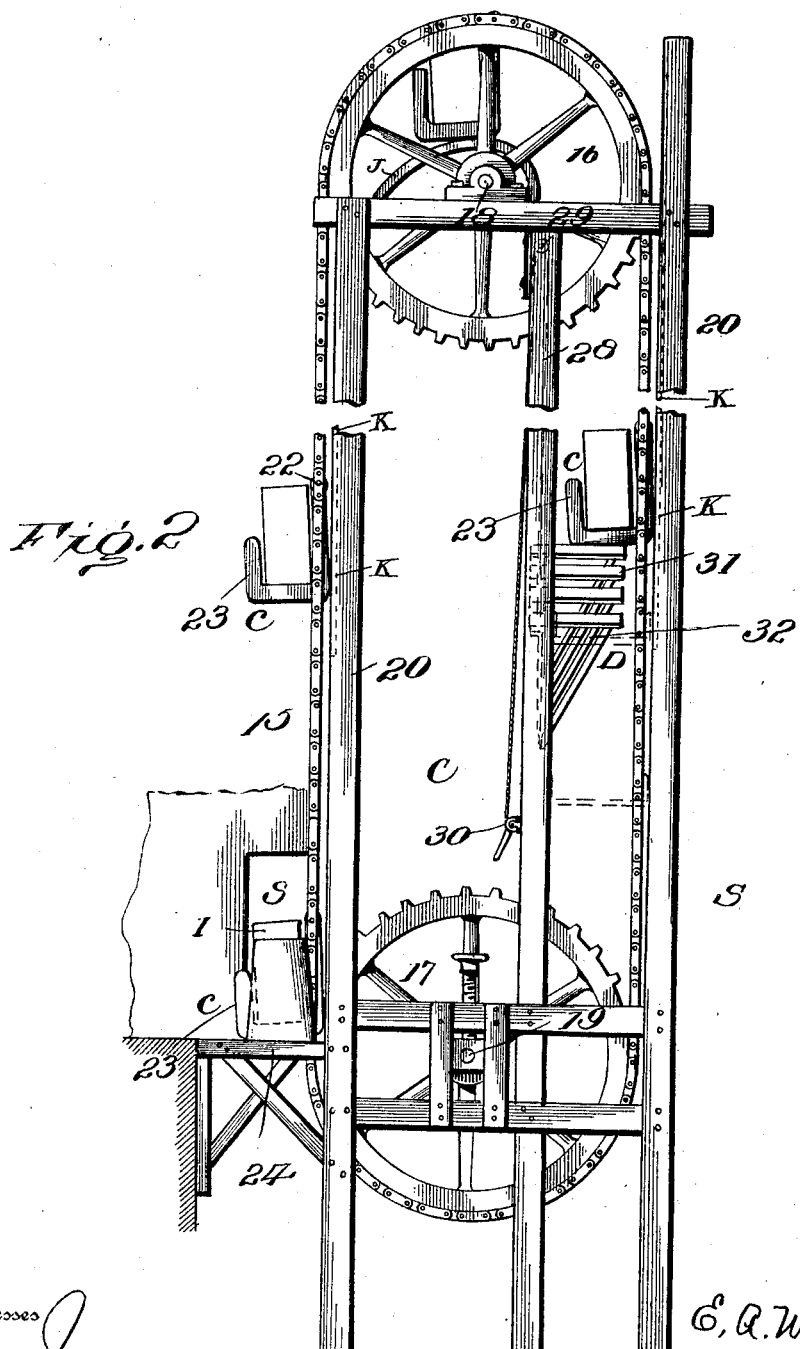

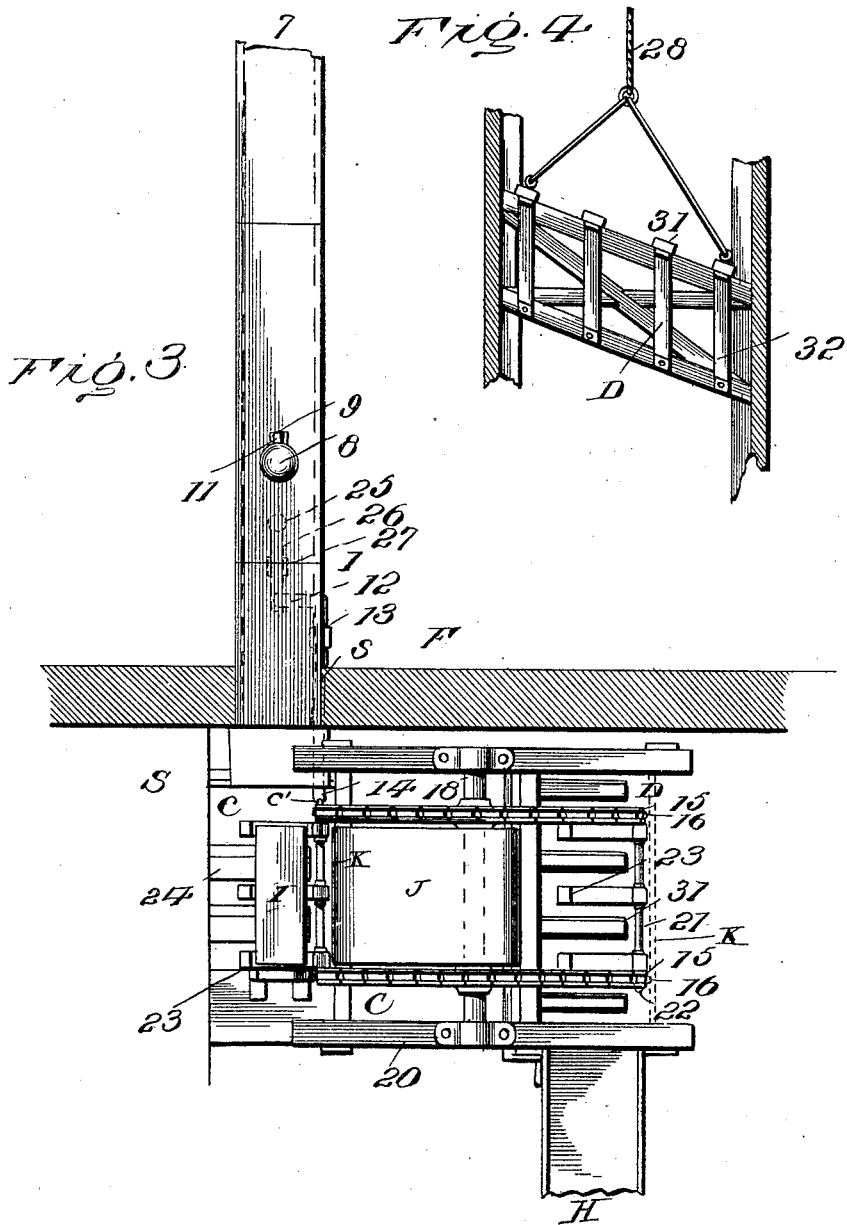

UNITED STATES PATENT OFFICE.

EDGAR A. WRIGHT, OF CANTON, OHIO, ASSIGNOR TO THE AULTMAN COMPANY, OF CANTON, OHIO, A CORPORATION OF OHIO.

APPARATUS FOR ELEVATING OR CONVEYING AND TRANSFERRING ICE, &c.

SPECIFICATION forming part of Letters Patent No. 707,488, dated August 19, 1902.

Application filed February 15, 1900. Serial No. 5,371. (No model.)

*To all whom it may concern:*

Be it known that I, EDGAR A. WRIGHT, a citizen of the United States, residing at Canton, in the county of Stark and State of Ohio, have invented certain new and useful Improvements in Apparatus for Elevating or Conveying and Transferring Ice and for other Purposes, of which the following is a specification, reference being had therein to the accompanying drawings.

My invention has for its object to simplify and improve the construction of ice conveying or elevating and transferring machinery to the end that the same may be operated with rapidity and to a large extent automatically, eliminating hand labor to a great degree, and also in such manner as to prevent the escape from the storage-chamber of the ice-house of cold air or the entrance of warm air.

My improvements are especially designed for storing the ice-house through a door or opening near the bottom, the elevating and conveying of the ice taking place within the storage-chamber.

While it is required in some plants that all storage shall be effected through a door at or near the top of the storage-chamber or at or near the top level of the ice already stored, it is in some cases and for some purposes more convenient to first pass the ice into the storage-chamber at or near the bottom of the latter, and this latter mode is practicable provided that the delivery of the ice into said chamber be effected in such manner and by such means as to prevent the escape of air from or admission of air to the lower part of said chamber to any appreciable degree. This desirable object is effected by my present improvement, and in order to enable the invention to be clearly understood I have shown in the accompanying drawings means for carrying the same into practical effect without limiting my improvements in their useful applications to the particular construction which for the sake of illustration I have delineated.

In said drawings, Figure 1 is an elevation, partly in section, of so much of an ice conveying or elevating and transferring apparatus embodying my invention as is necessary for an understanding of the latter. Fig. 2 is an elevation of the same looking from the right-hand side of Fig. 1. Fig. 3 is a plan view. Fig. 4 is an elevation of the discharging device.

Referring to the particular apparatus illustrated in the drawings, it will be understood that the conveying or elevating means may be of any desired length vertically or in a direction inclined to the vertical, as may be rendered necessary by the height of the storage-chamber and the mode of depositing the ice therein. S indicates said chamber with which at or near the bottom of the same communicates the so-called "freezing-room" F by an opening *s*. The room F may be considered as typical of any room or space outside of the storage-chamber where the ice is produced or deposited preliminary to the storing operation. Connected with the opening *s* is a chute 1, having an inclined bottom 2 and constituting also an air-lock by means of outer and inner doors 3 and 4. These doors are of any construction suitable to be operated by the cake of ice I as the latter passes by gravity along the bottom 2, and are preferably of the construction shown, in which they are arranged to swing freely in an inward direction upon horizontal hinges 5 and 6, being also of such length as to gravitate against the bottom 2 as soon as the block I has passed.

7 is a platform or conduit on a level with the outer end of the chute 1 and from which the cakes of ice may be pushed into said chute through the door 3 by hand or by any suitable mechanical means.

8 is an indicator combined with the chute for the purpose of showing when the latter is occupied by a cake of ice. This indicator consists, preferably, of a bent lever hinged on the chute at 9, having an arm 10 within the air-lock in the path of the ice cake and a visible arm 11. The gravity of the arms 10 and 11 will cause the depression of the arm 11 unless an ice cake be present in the air-lock, in which case the arm 11 will be elevated and serve as an indication of such fact, as seen in Fig. 1. After the cake I has been introduced into the chute and the door 3 has closed the cake will be held in the air-lock ready for delivery at the proper time through the opening *s*. The ice cake may thus be held temporarily by a stop of any suitable character. In the construction illustrated the door 4 will serve this purpose, being normally locked against opening by a gravitating catch 12, hinged to the chute at 13 and having an arm 14 extending through the opening $s$ into the path of the conveying or elevating means C, which latter is situated in the storage-chamber. The latter comprises endless ropes, belts, or chains 15, mounted on drums or pulleys 16 17, one of which latter is driven from any convenient source of power. (Not shown.) Said drums or pulleys are carried by shafts 18 19, mounted in suitable bearings on a conveyer or elevator frame 20 of suitable length or height, according to the requirements of the storage-chamber.

$c$ indicates a series of carriers of any suitable construction carried by the endless chains 15. While these devices may be platforms of well-known construction, I prefer to make them as shown, comprising cross-bars 21, hinged in the endless chains by journals 22 and carrying two or more hooks 23. The latter are of such shape (see Fig. 2) as to securely hold a cake of ice upon its edge and convey or elevate the same to the desired point of delivery. When one of the carriers $c$ arrives opposite the opening $s$ in position to receive the ice cake, the lever 14 will be engaged and actuated by a suitable part of or projection on the elevator C, such as a pin $c'$, sufficiently to disengage the catch 12 from the door 4, thereby allowing the cake I to pass by gravity along the bottom 2 through the opening $s$ and onto a support 24, situated within the chamber S and in line with the rising leg of the elevator C. It will be understood that the support 24 will be so constructed as not to interfere with the hooks 23, but so as to hold the ice cake in proper position to be engaged by said hooks as they rise or advance, as seen at the lower part of Fig. 2. The chute 1 is now ready for the reception of another ice cake, which in turn will be automatically delivered, as above described, to the carrier $c$, succeeding the one which has just been loaded. Thus the process of introducing the ice cakes into the storage-chamber may be kept up continuously as long as desired, the ice being handled automatically after its delivery to the chute 1.

In some instances the block of ice in the chute may freeze or stick to the bottom 2. I may therefore provide a means for loosening or disengaging such ice cake, consisting, preferably, of a plunger 25, operating through the bottom 2 against the ice cake and actuated by a lever 26, pivoted at 27 on the chute 1 and actuated in turn by the part 12 as the latter moves, as already described, to release the door 4. Thus as said door is released the ice cake receives an impulse from the plunger 25, which will insure its descent along the bottom 2 and through said door to the conveyer or elevator C. I further provide for automatically transferring the ice cakes from the carriers $c$ at any desired height in the storage-chamber, according to the requirements of placing the ice in the latter. To this end I combine with the elevator C a discharging means D, mounted so as to be vertically adjustable upon the frame 20 in the path of the descending leg of the elevator, as by means of a rope 28, passing over a pulley 29 near the top of said frame and thence down to a windlass 30 within convenient reach near the bottom of said frame. It will be seen that by these devices the discharging means may be adjusted in height to practically any point along the course of the elevator C. The discharging device preferably comprises fingers 31, rigidly supported, as by braces 32, and situated so as to alternate with the hooks 23 of the carriers $c$, so that as said carriers descend and their hooks pass between the fingers 31 the ice cakes will be left one after the other upon the discharging device, from which they will pass by gravity (the discharging device being inclined, as shown) in a direction toward the end of the carrier $c$ and to any suitable chute or other receiving device H within the storage-chamber. As the process of storing the ice continues the discharging device D may be elevated from one to the other of a series of such chutes or receiving devices and the placing of the ice cakes within the chamber rapidly effected automatically and by means of gravity.

J is a guide or shield to steady and direct the carriers $c$ as they pass over shaft 18 between the wheels 16. The carriers $c$ are also or may be directed and guided vertically for the whole or the principal part of their travel while loaded by plates or guides K, attached to the frame 20 or otherwise suitably supported, so that the carriers will be maintained in vertical position while taking or discharging a load. The guides K may be applied only at such points at which the loading or discharging takes place—that is to say, opposite the devices 24 and D.

What I claim is—

1. The herein-described apparatus consisting of the combination with a storage-chamber, of an air-lock having inner and outer doors and an intermediate ice-space, and an elevating or conveying means within said chamber for receiving ice or other material from said lock.

2. The combination with a storage-chamber, of an air-lock having inner and outer doors and an intermediate ice-space, and an elevating or conveying means within the chamber acting to open said lock and adapted to receive the ice or other material therefrom.

3. The combination with a storage-chamber, of an inclined air-lock having inner and outer doors and an intermediate ice-space, and an endless conveying or elevating device within the chamber and acting to receive the ice or other material from said lock.

4. The combination with a storage-chamber, of an air-lock, a means for loosening a cake of ice therein, and an elevating or conveying means within said chamber acting to operate said loosening means and adapted to receive the ice or other material from said lock.

5. The combination of a conveying or elevating means, an inclined chute or platform, a device for loosening a cake of ice or other material therefrom, and an actuating means whereby the conveyer or elevator operates said loosening device.

6. The combination, with the elevator having a carrier provided with a space or spaces, of a discharging device having a supporting arm or arms in line with said spaces, and means for adjusting said discharging device bodily longitudinally of the elevator.

7. The combination with the elevator C, of the chute 1 having an air-lock with inner and outer doors and an intermediate ice-space and an indicator 8, having an arm extending into said lock between the doors.

8. The combination of the elevator C having carriers provided with hooks 23, the support 24, the chute having an air-lock and adapted to deliver a cake of ice to said support, and a vertically-adjustable discharging device D.

9. The combination of the storage-chamber, an elevator within the same, means for directing the ice through the wall of said chamber to the elevator comprising a passage-way, a door or stop for holding the ice, a latch or fastening device for said door, and means whereby the elevator releases said latch.

10. The combination with the endless elevator and the swinging carriers c, of the shield J arranged between the upper wheels or pulleys of said elevator and adapted to engage the under side of the carriers.

11. The combination of an endless elevator comprising two chains or members, a swinging carrier c suspended and adapted to swing between said members and having its line of pivotal connection with the elevator situated at one side of the load-supporting portion of the carrier, means for discharging the load situated longitudinally of the elevator in line with said carrier, and a guide for holding said carrier out of its normal suspended position and in line with the discharging means.

12. The combination of an elevator having a carrier provided with a space or spaces and a discharging device having an arm or arms in line with said spaces and inclined in a direction toward the end of said carrier.

13. The combination of an elevator having a carrier provided with a space or spaces, a discharging device having an arm or arms in line with said spaces, and inclined in a direction toward the end of said carrier, and guides in which said discharging device is adjustable longitudinally of the elevator.

In testimony whereof I affix my signature in presence of two witnesses.

EDGAR A. WRIGHT.

Witnesses:
MELVILLE B. COX,
WM. A. LYNCH.